Figure 1:
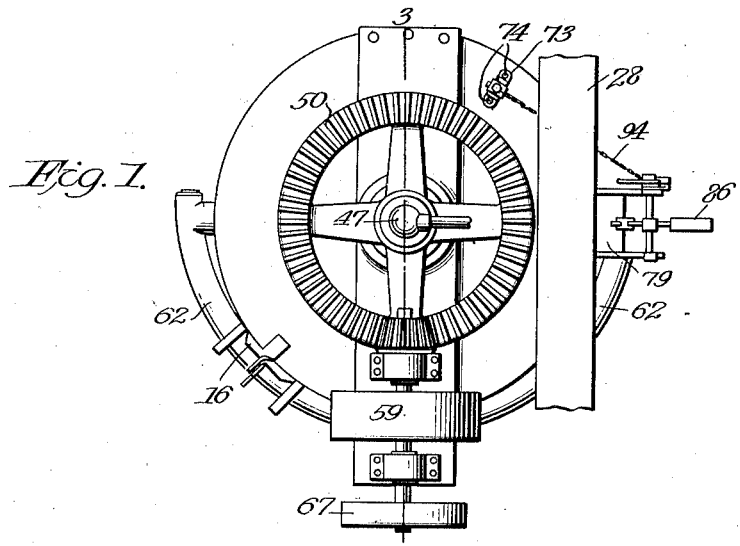

Aug. 13, 1929.  J. DAVIDSON  1,724,073

METHOD FOR TREATING OLEAGINOUS MATERIALS

Filed April 10, 1928  3 Sheets-Sheet 1

Inventor

Joseph Davidson

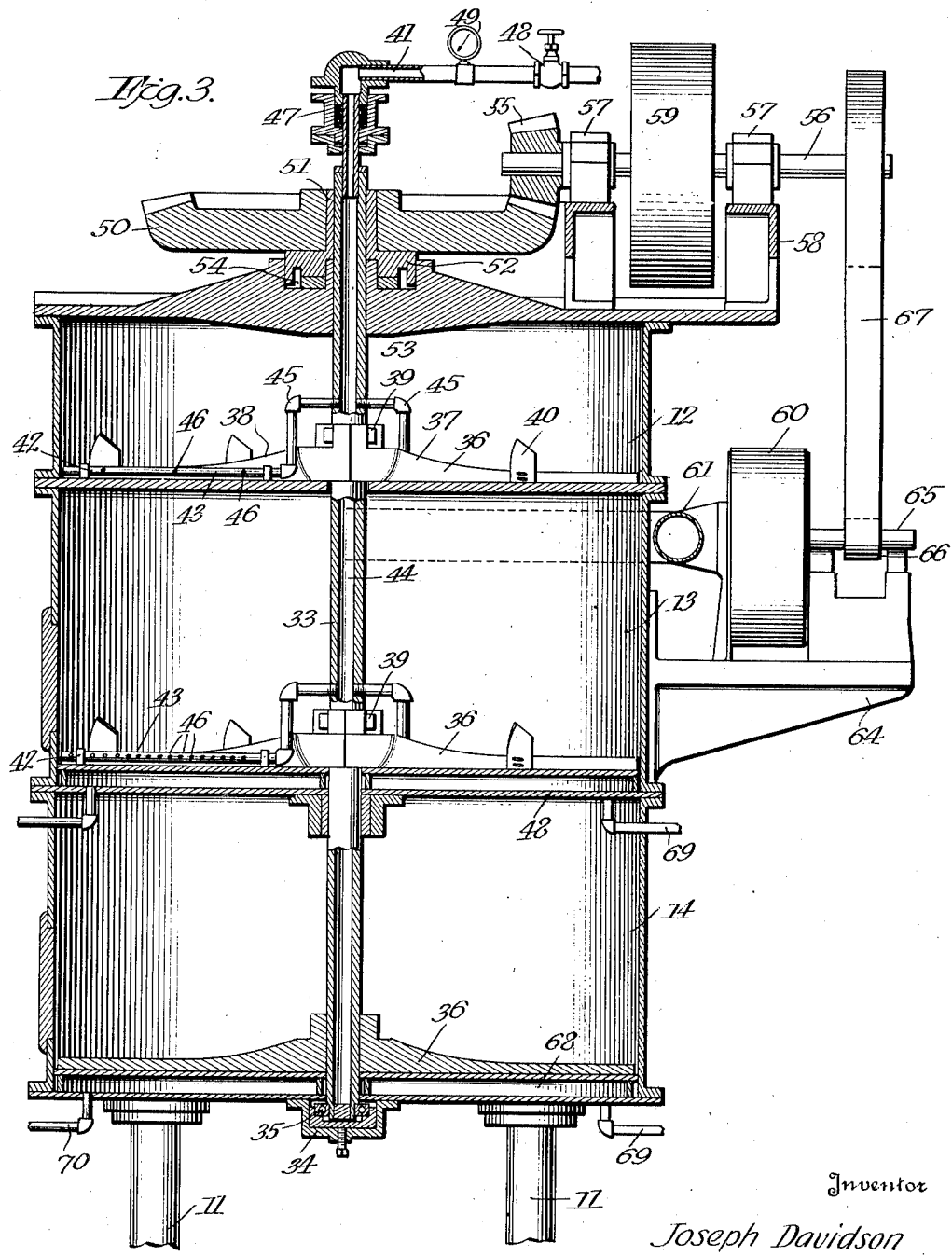

Aug. 13, 1929.  J. DAVIDSON  1,724,073
METHOD FOR TREATING OLEAGINOUS MATERIALS
Filed April 10, 1928   3 Sheets-Sheet 3
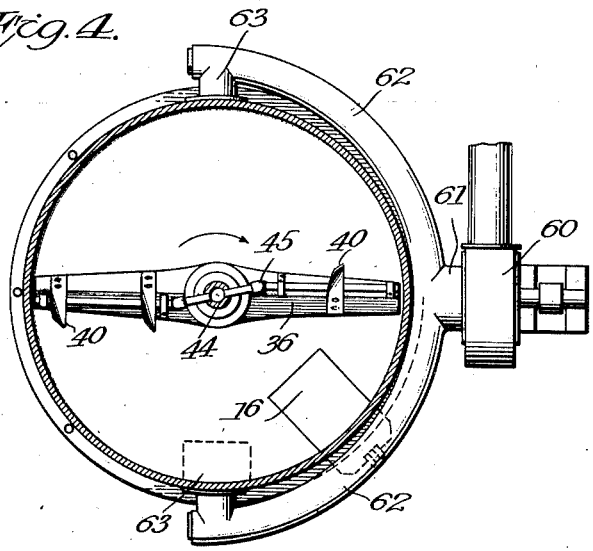
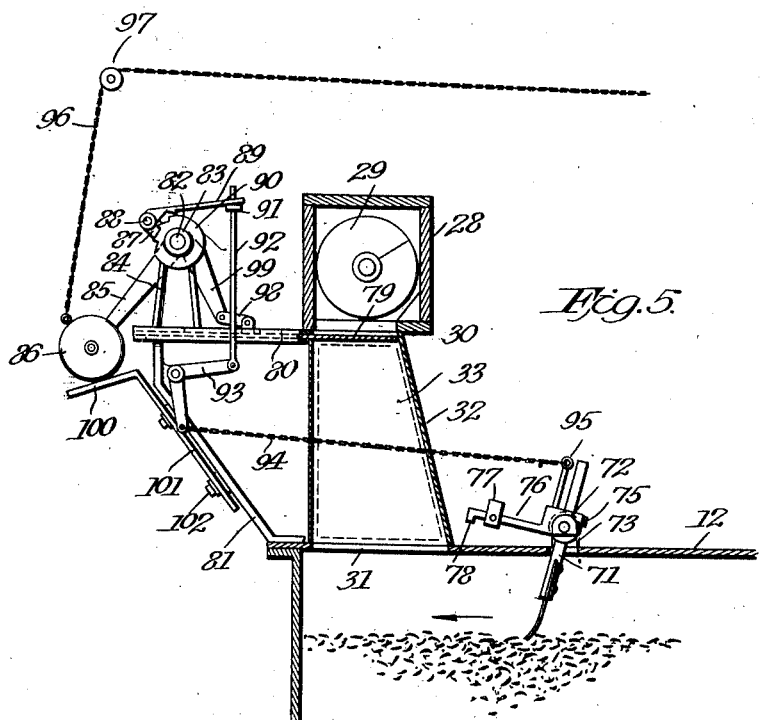
Inventor
Joseph Davidson Patented Aug. 13, 1929.

1,724,073

UNITED STATES PATENT OFFICE.

JOSEPH DAVIDSON, OF ATLANTA, GEORGIA, ASSIGNOR TO DAVIDSON-KENNEDY COMPANY, OF ATLANTA, GEORGIA, A CORPORATION OF GEORGIA.

METHOD FOR TREATING OLEAGINOUS MATERIALS.

Application filed April 10, 1928. Serial No. 268,917.

This invention, which is a continuation in part of my co-pending application Serial No. 136,166, filed Sept. 17, 1926, relates to an improved method of cooking oleaginous material and other oil bearing meats, such as cotton seeds and nuts preparatory to extracting the oil therefrom.

At the present time, there are two distinct manufacturing processes in the vegetable oil industry, one being the crude oil treatment, that produces the oil from the oil bearing material, and the other the vegetable oil refinery, which refines the crude oil and converts it into various commercial products.

The present invention primarily relates to the production of crude oil, and consists essentially in passing superheated or saturated steam at a temperature in excess of 400° F. directly through the meats from the bottom upwardly, and removing the excess steam and moisture from above the meats.

Heretofore, the oil bearing material has been treated in steam jacketed kettles, and the necessary heat for cooking it has been absorbed from the hot surface of the kettles, with which the meats are in contact. In such a construction, only a small portion of the meats in the kettle are in contact with the heated surfaces at any one time. Consequently, in order to properly cook the meat, it is necessary that it contain sufficient moisture to become heated by contact with the hot surface of the kettle. When the moisture content in the material is not enough, the meats are removed in an uncooked condition, making it impossible to press or extract the maximum amount of oil therefrom. On the other hand, when the moisture content in the meat is too high, it leaves the kettle not properly cooked, and does not yield a maximum extraction of oil. Moreover, high moisture in the cooked meats causes excess breaking of the cloth or mats which surrounds the meats in the presses. It is not an uncommon practice when cooking meats with a low moisture content to add moisture to the meats either in the form of water or saturated steam. Such addition of moisture is usually made by guess or trial, until the cooked meats appear to be properly treated, depending upon the judgment of the operator. When the natural moisture contents in the meats is too high, steam pressure must be used in the kettle jackets or the meats must be held in the kettles for a longer duration. Sometimes, both higher steam pressure and a longer time is required, thus slowing down the working capacity of the plant. As the natural moisture contents of the meats from oleaginous materials is of unknown quality, and varies from time to time, it is very difficult for the operator to regulate the moisture, steam pressure, and time of cooking, as a result, large quantities of the meats are improperly cooked, thus causing the mills to suffer a great loss in oil yields, and working capacity.

By reason of the present method and apparatus, the difficulties heretofore encountered are removed, and an improved quality of oil is obtained from the cooked meats in an efficient and economical manner.

Some of the other objects and advantages obtained by the present method as against the old method of indirect heating of the oil bearing material are: (1) The present method shortens the period of time required to properly cook the material, thus decreasing the power required to operate the cookers; (2) the present method relieves the operator from either adding moisture to the material or taking it away, as is now necessary in the old method of cooking, due to the fact that the meat moisture content of the seed varies considerably in the course of a season and at times the meats are so dry that artificial moisture must be added and at other times they are so wet that the excess moisture has to be exhausted, thus necessitating a longer time of cooking, whereas by passing steam at a temperature in excess of 400° F. directly through the meats, as is effected by the present process, it makes no practical difference whether the meats are dry or wet at the beginning. Since the improved quality of the oil extracted is primarily due to the high temperature of steam to which the material is subjected, (3) the present method of cooking tends to quickly coagulate or neutralize certain matter, that would otherwise effect the refining loss and color.

While the improvement in the quality of oil is one of the greatest advantages of my method of cooking, it has been fully demonstrated that the worse the quality of oil bearing seed being treated or cooked, the greater the proportion of improvement in the oil. Additionally, the present method delivers the material in a more uniform cooked condition than the old method, thus increasing the amount of oil obtained from the material. Furthermore, by the present method, after the oil has been expressed from the cake and the cake is ground into meal, the meal has a much brighter color than when made from cakes by the old method of cooking.

Figure 2:
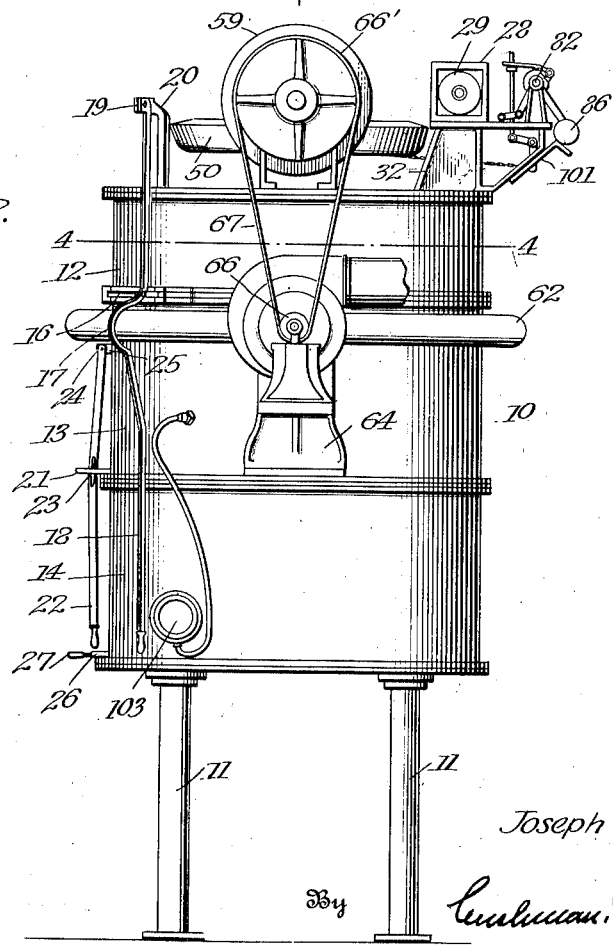

Referring to the drawings in which is shown a preferred form of apparatus for carrying out my method:

Figure 1 is a plan view of the apparatus.
Figure 2 is a side elevation of Figure 1.
Figure 3 is a sectional view taken substantially along the line 3—3 of Figure 1.
Figure 4 is a sectional view taken substantially along the line 4—4 of Figure 2.
Figure 5 is a sectional detail view of a portion of the kettle showing the automatic control mechanism for regulating the supply.

Referring to the drawings in which is shown a preferred form of apparatus for carrying out my method of treating the oleaginous material preparatory to the extraction of the crude oil therefrom, 10 indicates a kettle or receptacle which is supported by the legs 11 and is preferably divided into a measuring compartment 12, a cooking compartment 13 and a receiving compartment 14. Each of these compartments has in the bottom thereof a discharge opening 15 (Fig. 4) the supply through which is controlled by any suitable mechanism. As shown, the opening 15 in the bottom of the measuring compartment or chamber 12 has associated therewith a slidable valve 16, which is suitably connected as at 17 to a manually operating lever 18 (Fig. 2) which lever at its upper end is pivoted as at 19 to a bracket 20 secured to the kettle. The opening in the cooking kettle is likewise provided with a gate valve 21 which is connected to a manually operating lever 22 as at 23. The lever 22 is pivoted at its upper end as at 24 to a lug 25. The opening in the bottom of the receiving kettle may also have a slidable valve 26, the handle 27 of which extends exteriorly thereof so as to be in a position to be conveniently manipulated.

The measuring compartment 12 has preferably mounted on the top thereof a delivery trough or container 28 in which is mounted a spiral conveyor 29, that receives the material from any suitable point of supply and conducts it to the kettle to be treated. The trough 28 is provided with an opening 30 that aligns with a complementary formed opening 31 in the top of the measuring compartment 12 (Fig. 5). A housing 32 encloses the passage 33 formed between the trough 28 and the kettle 10 and acts as a chute for delivering the material to be treated to the interior of the measuring compartment 12.

Extending vertically through the kettle 10 is a tubular drive shaft 33, the lower end of which is journalled in the bearing 34 connected to the underside of the receiving compartment 14 and is preferably provided with the ball bearings 35 for reducing the friction on the shaft 33. Mounted in each of the compartments 12, 13 and 14, adjacent the bottom thereof, is a revoluble sweep 36, which preferably is composed of the sections 37 and 38 that are clamped to the drive shaft 33 by the bolts 39 (Fig. 3) so as to be revoluble therewith. Each of the sweeps 36 may also be provided with the upwardly projecting stirrer arms or blades 40 for insuring the proper agitation of the material prior to its being discharged from one compartment to the other.

The tubular shaft 33 also acts as a conduit for conducting superheated or saturated steam from a supply pipe 41 to the interior of the measuring and cooking compartments 12 and 13 respectively. In order that this may be effected, the sweeps 36 have secured thereto by the lugs 42, the radially disposed perforated pipes 43 which communicate with the steam supply passage 44 through the branches 45. The pipes 43 in the measuring kettle are provided with a smaller number of perforations 46 than are the pipes in the cooking compartment, since it has been found that a small amount of superheated steam should be admitted into the measuring compartment so as to bring up the moisture and temperature of the material before it is discharged into the cooking compartment so that it will be preliminarily heated and immediately go to cooking when delivered to the compartment 13. The shaft 33 is rotatably connected to the supply pipe 41 by a revoluble coupling 47. The pipe 41 communicates with any suitable source of steam supply (not shown) and is provided with a valve 48 for controlling the supply of steam to the kettle and may also have mounted thereon a steam gage 49, for indicating the increase or decrease of the pressure of the steam delivered to the kettle.

The drive shaft 33 is actuated by a gear wheel 50 that is mounted in a bearing 51 splined to the shaft 33. The bearing 51 may also have an enlarged annular portion 52, which rests in a packing 53 mounted in a recess 54 formed in the top of the kettle 10. The gear wheel 50 meshes with a complementary pinion 55 keyed or otherwise secured to a shaft 56, which shaft is supported by the bearings 57 carried by the brackets 58, which brackets are suitably mounted on the kettle. The shaft 56 may be driven in any suitable manner such as by a pulley wheel 59 that is arranged to be connected to a motor or the like (not shown).

The excess steam and moisture in the cooking compartment 13 is withdrawn therefrom preferably by a suction fan 60 which communicates with the interior of the cooking compartment through the pipe 61 that has the lateral branches 62 that extend into the interior of the compartment 13 as at 63 (Fig. 4). The fan 60 is supported by a bracket 64 suitably secured to the kettle and is provided with a shaft 65 on which is secured a pulley wheel 66 that is connected by an endless belt 67 to a pulley 66' on the shaft 56, so that the fan may be simultaneously operated with the actuation of the drive shaft 33 and its associated parts.

The bottom of the compartments 13 and 14 are preferably formed with the heating chambers 68 in which a small amount of steam is delivered by the pipe 69 and escapes therefrom through the pipe 70, so as to prevent the temperature of the material from lowering as it falls from the cooking chamber 13 to the receiving chamber 14.

The amount of material delivered from the conveyor 29 to the measuring compartment 12 may be automatically regulated by means of a swinging paddle 71, that extends vertically through an opening in a boss 72 that is pivotally mounted between the lugs 73, which lugs are suitably secured to the top of the kettle by the bolts 74 (Fig. 1). An externally disposed set screw 75 is arranged to permit the paddle 71 to be maintained in any predetermined vertical position as may be desired. The boss 72 has a laterally extending arm 76 (Fig. 5) which extends loosely through a lug 77 and also has a depending finger 78, for limiting the movement of the paddle. A slidable gate 79 is arranged to extend into the opening 30 in the bottom of the trough 28, so as to control the supply of material delivered from the conveyor 29 to the interior of the measuring compartment 12. This gate is slidably mounted in a housing 80 that is supported by a bracket 81, secured to the kettle. A rotatable shaft 82 is journalled in bearings 83 formed in the supporting arms 84, which arms are suitably attached to the housing 80. Splined or otherwise secured to the shaft 82 is a bell crank having connected to the free end of one of its arms 85 a ponderous member 86 and to its other arm 87 is pivotally secured as at 88, a pawl 89 that is arranged to engage a notch disc or ratchet 90 keyed or otherwise secured to the shaft 82. The free end of the pawl 89 rests against a support such as a nut or the like 91 secured to a rod 92, which rod is pivoted at its lower end to one arm of a bell crank 93, while the other arm of the bell crank is connected by the chain 94 to an arm 95 on the boss 72. The ponderous member 86 is connected to one end of a chain 96, which passes over a sheave pulley 97, while the opposite end of the chain is arranged to extend to a point convenient to where the operator stands. The gate 79 is operatively connected by a link 98 to an arm 99, keyed or otherwise secured to the shaft 82, so that upon the actuation of said shaft reciprocating movement will be imparted to the gate 79, in order to open or close the opening 30.

The gate 79 is normally maintained in its open position due to the pawl 89 engaging the teeth of the disc 90, so as to prevent rotation of the shaft 82 or the actuation of the valve 79. When the parts are in this position, the weight 86 is moved upwardly out of engagement with the seat 100 formed by a portion of the arm 101, that is secured by the bolts 102 to the bracket 81. As the meats in the measuring compartment 12 have a rotary movement in the same direction as the sweeps 36, this movement of the meats is sufficient when they come in contact with the swinging paddle 71 to move it forward enough to pull the chain 94, which in turn actuates the bell crank 93 and rod 92 to raise the free end of the pawl 89, thus releasing the pawl from engagement with the disc 90 and allowing the ponderous member 86 to drop and the shaft 82 to rotate, which in turn causes the arm 99 to move the gate 79 to its closed position (Fig. 5). The operator then opens the valve 16 in the bottom of the measuring kettle which allows the material therein to be conducted to the cooking kettle 13. When the measuring kettle has been emptied, the operator then pulls the chain 96 which raises the weight 86 and arm 85, thus rotating the shaft 82 and causing the gate 79 to be moved to its open position and maintained therein by the pawl 89 falling into locked engagement with the toothed portion of the disc 90.

The operation of the device is as follows:

Assuming that superheated steam in excess of 400° is being conducted by the pipe 41 to the interior of the measuring compartment 12 and the cooking compartment 13 through the perforations in the pipes 42, and the drive shaft 33 and its associated parts are being revolved by the pulley wheel 59, the crushed seed or material is conducted by the conveyor 29 through the trough 28 to the opening 30. Moreover, assuming that the gate 79 has been previously moved to its open position, the material will be delivered to the measuring compartment 12 and when this compartment fills up to a predetermined depth, the material therein which is being rotated by the sweeps 36 will be brought into contact with the swinging paddle 71, causing the same to move in the direction of the arrow (Fig. 5) which in turn moves the chain 94 in an opposite direction, thus raising the rod 92 which causes the pawl 89 to be moved out of locking engagement with the disc 91 which allows the weight 86 to fall by gravity to the position as shown in Figure 5 and rotates the shaft 82 that actuates the arm 99, so as to cause the same to move the gate 79 to its closed position (Fig. 5). The operator then opens the valve 16 in the bottom of the measuring kettle 12 by the actuation of the lever 18 which empties the material into the cooking compartment 13. After this has been done the operator then pulls the chain 96 so as to raise the weight 86 and the arm 85 upwardly, which rotates the shaft 82, so as to move the gate 79 to its open position. During the meantime, the pawl 89 falls into engagement with the teeth on the disc 90, thus temporarily preventing the movement of the shaft 82.

A thermometer 103 (Fig. 2) is positioned outside of the kettle and has its bulb extending into the cooking compartment 13, so as to register the actual degrees of heat of the material being cooked. When this thermometer registers a temperature of approximately 235° F., it notifies the operator that the material is sufficiently cooked and he then opens the valve in the bottom of the cooking compartment by actuating the lever 22, so as to cause the material to be delivered to the receiving compartment 14 from where it may be delivered to a cake forming machine (not shown) through the opening of the valve 26 that is actuated by a handle 27. Of course, it will be understood that the treating of the material is continuous, that is to say, as soon as the material delivered to the measuring compartment reaches a predetermined depth, the paddle 71 will cut off the supply thereto and the operator will empty the contents of this compartment into the cooking compartment and then open the valve 79, so as to deliver a fresh supply of material to the measuring compartment.

The excess steam and moisture in the cooking compartment 13 is withdrawn therefrom by the suction fan 60, so that while the temperature of the steam passing through this compartment is in excess of 400° F., the material being cooked only reaches a temperature of approximately 235° F. With this method of cooking, the material is usually treated for a period of about twenty minutes which is the pressing schedule in most oil mills. Experiments have shown that the temperature in the material of 235° F. is reached in less than eighteen minutes, but the material need not be removed from the cooking compartment until several minutes thereafter. Keeping the material in the cooking compartment after it reaches 235° does not tend to burn or impart any undesirable flavor thereto, since the temperature does not rise above this point, it being held there by the ratio of evaporation to the quantity of steam passing through the material and the fact that the suction fan 60 is continuously withdrawing the excess steam and moisture. Of course, if it were desirable to raise the temperature of the cooking material beyond 235° F., this could be readily effected by providing a valve in the pipe 61, so as to close or partly close the outlet which would allow the temperature in the cooking compartment 13 to be raised to any temperature desired.

By reason of the treating or cooking of oleaginous material preparatory to the extraction of the crude oil therefrom by passing steam having a temperature in excess of 400° F. directly through the material from the bottom upward and drawing off the excess steam and moisture, it has been found that not only does this process produce a better quality of oil, but it also reduces the cooking time and effects a considerable economy in the cost of operation.

I prefer to cook the material by treating it with superheated steam since experiments have proven that cotton seed meats are more thoroughly cooked when subjected to superheated steam than when treated by saturated steam. The best quality of oil is obtained when the temperature of the steam moving directly through the oleaginous material ranges from between 400° F. to 700° F.

It is to be understood that the method and apparatus herewith shown are merely illustrative of preferred embodiments of my invention and that such changes as fall within the purview of one skilled in the art may be made without departing from the spirit of the invention and the scope of the appended claims.

What I claim is:

1. The process of cooking the seeds of oil bearing materials preparatory to the extraction of crude oil therefrom, which consists in passing steam having a temperature in excess of 400° F. directly through the material, and drawing off the excess steam and moisture.

2. The process of cooking oleaginous material which consists in passing steam having a temperature in excess of 400° F. directly through the material from the bottom upward and drawing off the excess steam and moisture.

3. The process of treating oleaginous material which consists in passing steam having a temperature ranging between 400° F. and 700° F. directly through the material from the bottom upward and drawing off the excess steam and moisture.

4. The process of cooking the seeds of oil bearing material preparatory to the extraction of crude oil therefrom, which consists in passing superheated steam having a temperature in excess of 400° F. directly through the material from the bottom upward, and drawing off the excess steam and moisture above the material.

5. The process of cooking the seeds of oil bearing materials preparatory to the extraction of the crude oil therefrom which consists in subjecting the material to steam having a temperature in excess of 400° F., and drawing off the excess steam and moisture.

In testimony whereof I have hereunto set my hand.

JOSEPH DAVIDSON.